United States Patent [19]
Mine

[11] Patent Number: 6,011,707
[45] Date of Patent: Jan. 4, 2000

[54] SWITCHING-TYPE DC POWER SOURCE APPARATUS

[75] Inventor: Ryuta Mine, Mishima, Japan

[73] Assignee: Canon Kabushiki Kaisha, Tokyo, Japan

[21] Appl. No.: 09/203,514

[22] Filed: Dec. 1, 1998

[30] Foreign Application Priority Data

Dec. 5, 1997 [JP] Japan .................................... 9-350205

[51] Int. Cl.[7] ................................................ H02M 7/155
[52] U.S. Cl. ................................................ 363/89; 363/60
[58] Field of Search ................................ 363/78, 81, 84, 363/89, 125, 59, 60; 323/222

[56] References Cited

U.S. PATENT DOCUMENTS

| | | | |
|---|---|---|---|
| 5,295,036 | 3/1994 | Yagi et al. ................................ | 361/79 |
| 5,396,165 | 3/1995 | Hwang et al. ............................ | 323/210 |
| 5,495,164 | 2/1996 | Heng ........................................ | 323/222 |
| 5,629,588 | 5/1997 | Oda et al. ................................ | 315/308 |
| 5,737,204 | 4/1998 | Brown ...................................... | 363/89 |
| 5,793,623 | 8/1998 | Kawashima et al. .................... | 363/56 |
| 5,793,624 | 8/1998 | Couture et al. ........................... | 363/89 |
| 5,929,591 | 7/1999 | Katou et al. ............................. | 318/723 |

*Primary Examiner*—Adolf Deneke Berhane
*Attorney, Agent, or Firm*—Fitzpatrick, Cella, Harper & Scinto

[57] ABSTRACT

In a switching-type DC power source apparatus which uses a booster-chopper type active filter circuit as its rectifier circuit, even at zero-crossing timing of an AC voltage to be input in the rectifier circuit, a current supply source for making a current as if it is flowing is added to a current detection circuit for detecting the current flowing in the active filter circuit, thereby preventing a prickle-like input current including a number of harmonic components from flowing in the apparatus.

7 Claims, 4 Drawing Sheets

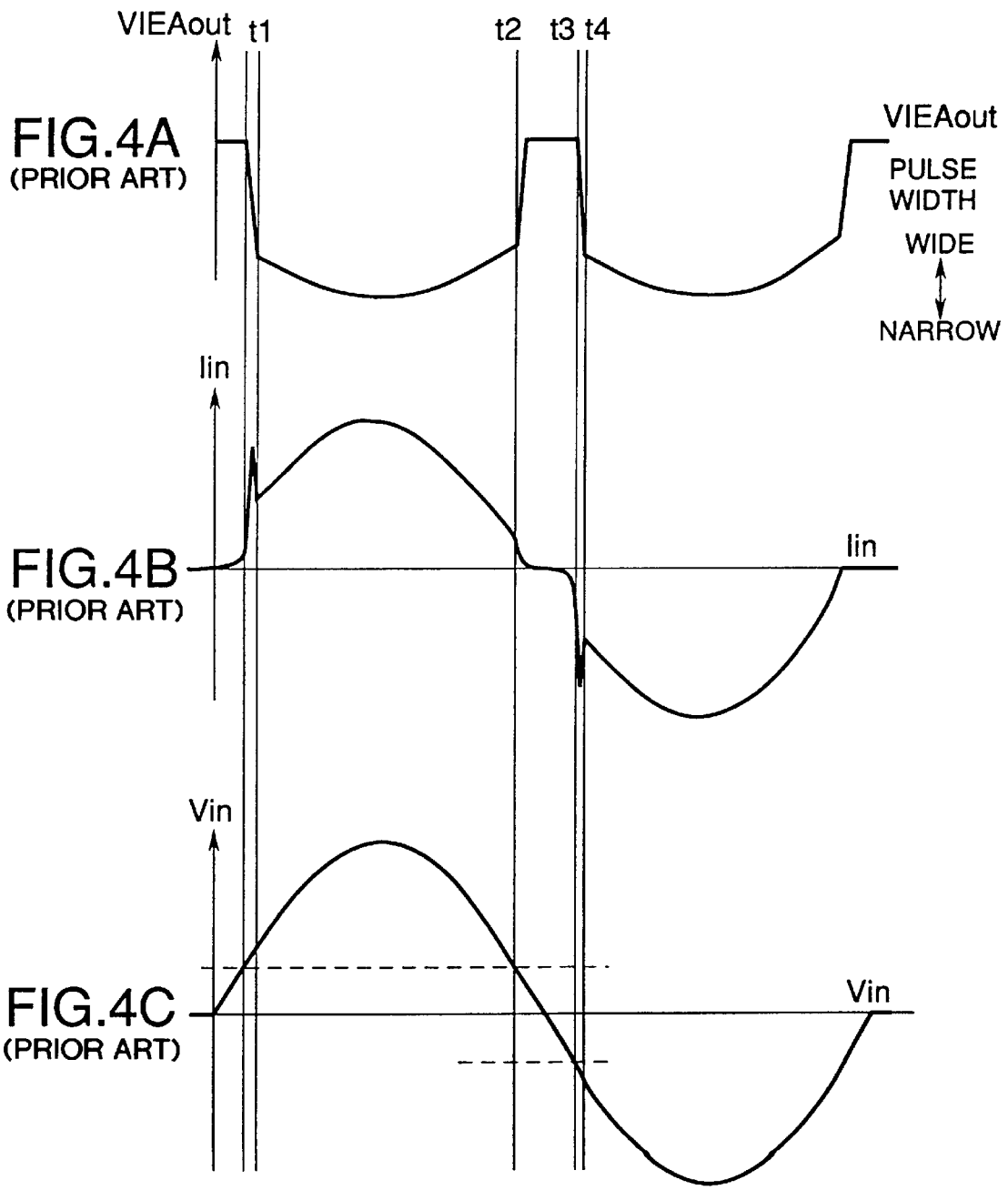

SWITCHING-TYPE DC POWER SOURCE APPARATUS

BACKGROUND OF THE INVENTION

1. Field of the Invention

The present invention relates to a switching-type DC (direct current) power source in which an active filter is used.

2. Related Background Art

In recent years, a capacitor-input rectifier circuit has been widely applied as a rectifier smoothing circuit to a switching-type DC power source apparatus. In this rectifier circuit, an input current flows only in a discharging period, i.e., an "ON" period of a smoothing capacitor. Therefore, in a practical state, a pulse-like input current having a peak value several times as much as an effective value of the input current tends to flow in this circuit, and also a power factor is restrained to 0.6 or so. For this reason, a harmonic noise occurred due to such the low power factor has become problem.

That is, since a pulse-like current waveform includes a number of harmonic components, if plural equipments each of which has the power source apparatus applying the capacitor-input rectifier circuit are connected to an identical commercial AC (alternate current) power source line, a commercial AC line waveform is distorted as the number of connected equipments increases, whereby an operation of one equipment may cause erroneous operations of the other equipments. Further, due to a peak current and a line impedance, a top of a commercial AC voltage waveform is crushed and thus the waveform becomes a trapezoid or trapezium. Even in such a state, since it generally continues to supply constant power, a commercial AC current further increases, whereby a pulse waveform becomes still more sharp. Thus, such a phenomenon further increases voltage drop, resulting in vicious circle.

In recent years, various systems or methods have been proposed to solve the problems of power factor and harmonic noise. In these systems and methods, an active filter capable of increasing a filter effect by switching active elements such as a transistor, an FET (field effect transistor) and the like at high speed and also capable of downsizing the power source apparatus has been come into notice.

A switching power source apparatus using the active filter in its rectifier unit has various advantages. That is, the apparatus has a switching power source function to always maintain an output voltage at a constant level even if an input voltage varies. In addition, the apparatus detects the commercial AC input current and the commercial AC input voltage waveform and performs pulse-width control (PWM control) such that a commercial AC input current waveform becomes analogous to the commercial AC input voltage waveform. Thus, the input current always has a sine wave, whereby it becomes possible to increase the power factor and reduce the harmonic noise. Further, a current to be input to the smoothing capacitor can be suppressed to 1/10 to 1/5 as compared with the conventional capacitor-input rectifier circuit. Furthermore, since a current ripple becomes small, capacity of the smoothing capacitor can be made smaller, whereby the entire apparatus can be made compact in size.

FIG. 3 is a diagram showing a structure of a conventional switching-type DC power source apparatus. This power source apparatus uses a booster-chopper type active filter, and an input side thereof is connected to AC power source input terminals 1 and 2. Further, this power source apparatus is composed of a rectifier circuit (e.g., diode bridge) DB1 which performs full-wave rectification of an AC input power source voltage, and a booster-chopper type active filter circuit (to be referred simply as active filter hereinafter) 10 which performs smoothing on a pulsating voltage output from the diode bridge DB1 and outputs a DC voltage. Although not shown in FIG. 3, in a general way, DC—DC converters are respectively connected to output terminals 3 and 4 of the active filter 10 as loads, and DC constant voltage of 5V, 24V or the like is supplied to the respective loads.

The active filter 10 is composed of a choke coil L1 which is connected to a plus(+)-side output terminal of the diode bridge DB1, a switching element (e.g., FET) Q1 which performs switching of the pulsating voltage full-wave rectified by the diode bridge DB1, a rectifier diode D1 which transfers electromagnetic energy stored in the choke coil L1 and prevents counter flowing of energy stored in a smoothing capacitor C1 to rectify the pulsating voltage, a sine wave detection resistor R1 which detects an input voltage (i.e., pulsating voltage) waveform rectified by the diode bridge D1, a current detection resistor R2 which detects a current flowing in the circuit 10, output voltage detection resistors R5 and R6 which detect the output voltage, the smoothing capacitor C1, an active filter control circuit (to be referred simply as control circuit hereinafter) 5 which performs pulse-width modulation (PWM) control on a drive pulse (i.e., gate pulse) to drive the switching FET Q1 such that the output voltage between the output terminals 3 and 4 becomes constant and further an AC input current waveform becomes sine wave, and the like.

The control circuit 5 is composed of a voltage error amplifier VEA which performs output constant voltage control, a current error amplifier IEA which controls a commercial input current waveform to be a sine wave, a multiplier (MP) 6 which gives a predetermined threshold to the current error amplifier IEA, an oscillator (OSC) 8, a maximum ON duty restriction voltage source Vref2 which restricts maximum ON duty of the drive pulse, a minimum value voltage selection circuit 7 which selects lower one of outputs of the amplifier IEA and the voltage source Vref2 and then supplies the selected output to a comparator COMP, the comparator COMP which compares an output waveform of the circuit 7 and an output waveform of the oscillator 8 with each other and then outputs a drive pulse to turn on and off the switching FET Q1, and the like.

The commercial AC voltage supplied from the input terminals 1 and 2 is full-wave rectified by the diode bridge DB1, and the obtained pulsating voltage is then supplied to the active filter 10. The filter 10 performs switching on the supplied pulsating voltage by using the switching FET Q1 at a frequency equal to or higher than several tens kHz during an entire period. In a period during which the FET Q1 is ON, the current flows in the FET Q1 through the choke coil L1, whereby the electromagnetic energy is stored in the coil L1. Subsequently, when the FET Q1 is OFF, the electromagnetic energy stored in the coil L1 charges the smoothing capacitor C1 through the rectifier diode D1 and is also supplied to the load such as the DC—DC converter or the like through the output terminal 3.

ON and OFF of the switching FET Q1 are controlled by the control circuit 5 to output the DC constant voltage to the output terminals 3 and 4. Also, the PWM control is performed by the circuit 5 such that the input current waveform becomes the sine wave.

The control circuit 5 detects the output voltage by using the output voltage detection resistors R5 and R6, detects the full-wave rectified pulsating voltage waveform by using the sine wave detection resistor R1, detects the current flowing in the circuit 10 by using the current detection resistor R2, outputs the DC constant voltage to the output terminals 3 and 4, and controls a width of the drive pulse (i.e., gate pulse) to be supplied to a gate of the FET Q1 being the switching element such that the AC input current flowing in the circuit comes to have the sine waveform. In the drawing, numeral Vcc denotes a power source voltage of the control circuit 5.

Subsequently, an operation of the control circuit 5 will be explained in detail.

In order to stabilize the output DC voltage against load variation and input variation, the voltage error amplifier VEA outputs a DC voltage (this voltage determines magnitude of threshold being output of multiplier 6) such that a divided voltage value of the output voltage detected by the resistors (i.e., output voltage division resistors) R5 and R6 becomes equal to a reference voltage Vref1. The multiplier 6 multiplies the sine waveform (this waveform determines output waveform of multiplier 6) detected by the sine wave detection resistor R1 and the output of the voltage error amplifier VEA together, and then outputs a voltage being a threshold of the current error amplifier IEA.

The current error amplifier IEA operates such that, in the circuit, the current corresponding to voltage drop at the current detection resistor R2 becomes equal to the threshold voltage being the output of the multiplier 6. The comparator COMP compares the output of the amplifier IEA and the output of the oscillator 8 with each other to obtain the pulse for driving the switching FET Q1. In such the drive pulse, ON duty is controllable within a range from 0% to 100% in principle. However, the FET Q1 practically operates at ON duty 100% or so when an instantaneous value of the commercial AC power source being an input is close to "0" volt. Thus, also in consideration of an off time of the switching FET Q1, there is some fear that practically the FET Q1 can not be completely turned off, and thus the current continues to flow in the choke coil L1 and the switching FET Q1 for a certain time. In order to prevent this, the maximum ON duty restriction voltage source Vref2 (voltage therefrom is determined based on amplitude of oscillator 8 and setting maximum ON duty) and the minimum value voltage selection circuit 7 are provided. Thus, in the circuit 7, the output of the amplifier IEA and the output of the source Vref2 are compared with each other, and lower-voltage one is then input to the comparator COMP. That is, if the source Vref2 is set to have the voltage of ON duty 80% or so, the ON duty does not exceed 80% even if the amplifier IEA requires the ON duty 100% or so.

FIGS. 4A to 4C are views showing examples of waveforms at respective units in FIG. 3. Concretely, FIG. 4A shows the waveform of an output voltage VIEAout of the current error amplifier IEA, FIG. 4B shows the waveform of an AC input current Iin, and FIG. 4C shows the waveform of an AC input voltage Vin. In FIGS. 4A to 4C, during a period from a time t1 to a time t2, the ordinary PWM control (i.e., pulse width control) is performed. Then, an instantaneous value of the voltage Vin gradually decreases, and an operation at the maximum ON duty starts at the time t2. In this operation, since the current desired by the multiplier 6 does not flow in the current detection resistor R2, an output voltage VIEAout acts to expand an ON time width of the drive pulse and such a state is fixed.

Then, the AC input voltage Vin once becomes "0" volt, and the instantaneous value gradually increases. When the voltage Vin reaches the level to release the operation at the maximum ON duty at a time t3, the voltage VIEAout then acts to narrow the drive pulse. However, since the current error amplifier IEA responses at a frequency being double an AC input power source frequency, the voltage VIEAout slowly decreases, whereby it takes a long time until the voltage VIEAout in the above fixed state changes to have an ON time width desired by the multiplier 6. That is, the change of the voltage VIEAout overtakes at a time t4. During such the time, since the FET Q1 operates at the ON duty close to the maximum ON duty, a prickle-like AC input current Iin flows during the period between the times t3 and t4 as shown in FIG. 4B. In the drawings, the state at the time t4 is identical with that at the time t1.

In the conventional switching-type DC power source apparatus which uses the booster-chopper type active filter for its rectifier circuit, the input current desired as the multiplier output does not flow in the period during which the maximum ON duty is restricted, i.e., when the instantaneous value of the commercial AC power source being the input is close to "0" volt. Therefore, there is a case where the output of the current error amplifier continues to act to expand or widen the pulse width. In such the case, there has been a problem that, when the instantaneous value of the commercial AC power source voltage gradually increases up to the level capable of releasing the maximum ON duty restriction and thus the maximum ON duty restriction is actually released, since also the current error amplifier does not respond so quickly, the prickle-like AC input current including a number of harmonic components flows at the instant that the maximum ON duty restriction is released.

SUMMARY OF THE INVENTION

An object of the present invention is to provide a switching-type DC power source apparatus which can eliminate such a drawback as described above.

Another object of the present invention is to provide a switching-type DC power source apparatus which uses an active filter circuit as its rectifier circuit, wherein it prevents a prickle-like input current including a number of harmonic components from flowing in the apparatus.

Still another object of the present invention is to provide a switching-type DC power source apparatus which uses an active filter circuit as its rectifier circuit, wherein it prevents a prickle-like input current from flowing in the apparatus in an inexpensive manner, and it is possible to reduce the number of parts and cost.

Other objects of the present invention will be apparent from the following description taken in conjunction with the accompanying drawings, and the appended claims.

BRIEF DESCRIPTION OF THE DRAWINGS

FIGS. 4A, 4B and 4C are views each showing an example of waveform at each unit in FIG. 3.

DETAILED DESCRIPTION OF THE PREFERRED EMBODIMENTS

Hereinafter, the embodiment of the present invention will be explained with reference to the accompanied drawings.

Figure 1:
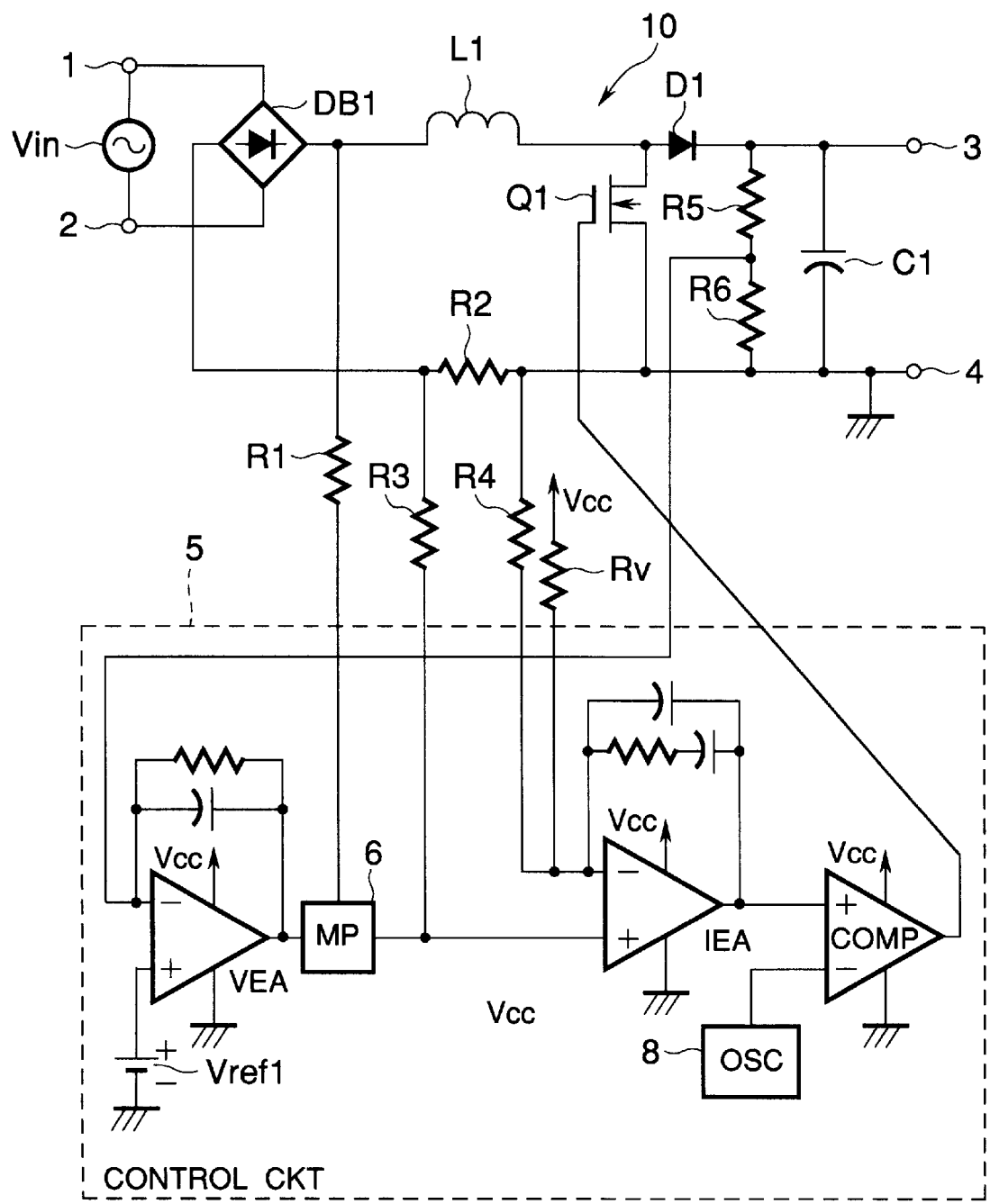
FIG. 1 is a diagram showing a structure of a switching-type DC power source apparatus according to the present invention.

FIG. 1 is a diagram showing a structure of a switching-type DC power source apparatus according to the present invention. In FIG. 1, since the parts denoted by the same reference numerals and symbols as those in FIG. 3 are the same as the parts mentioned in the related background art, explanation thereof is omitted in the embodiment.

Figure 3:
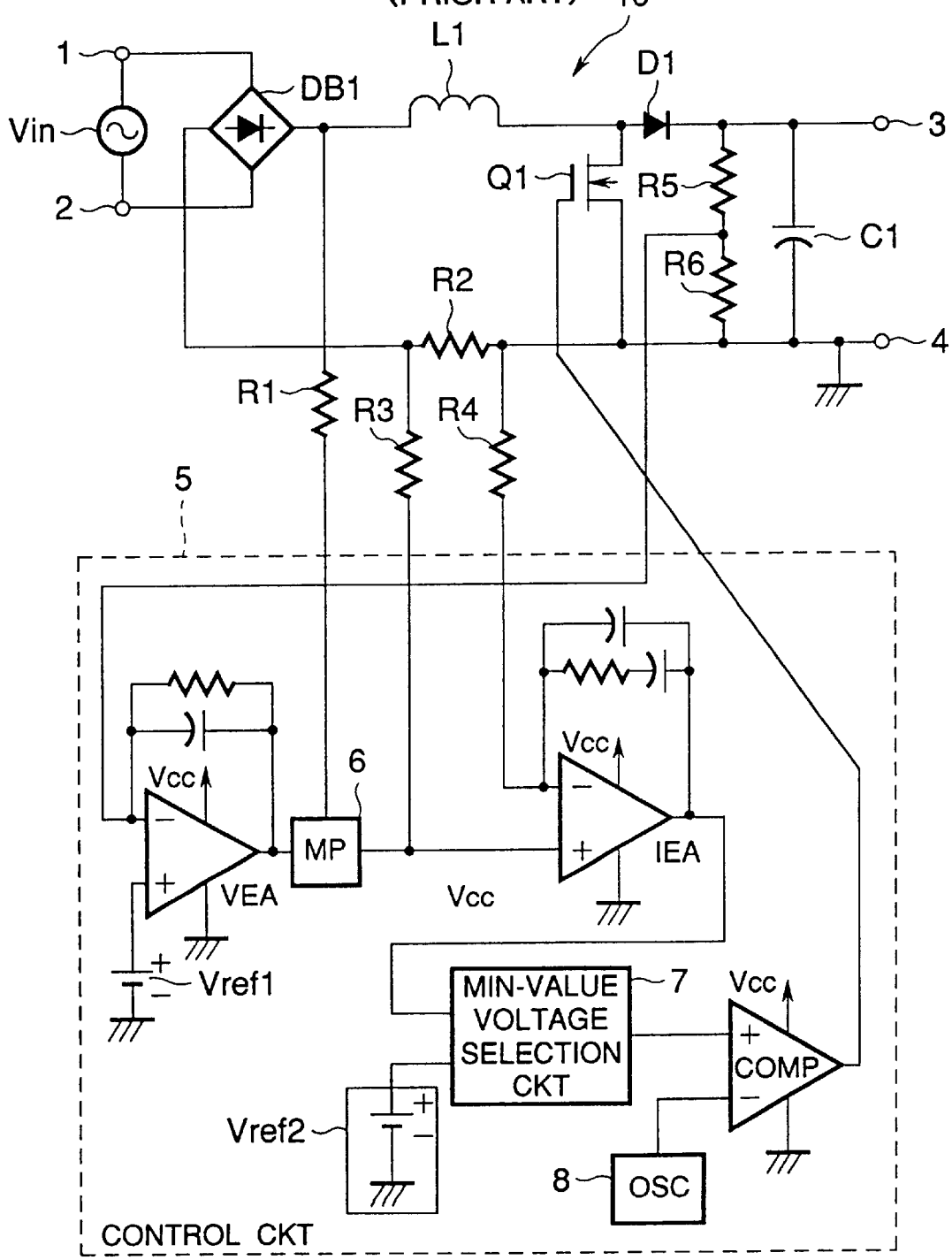
FIG. 3 is a diagram showing a structure of a conventional switching-type DC power source apparatus.

The switching-type DC power source apparatus shown FIG. 1 is different from that shown in FIG. 3 in the point that a resistor Rv is connected between a power source Vcc of a control circuit 5 and an inversion input terminal of a current error amplifier IEA, and in the point that the minimum value voltage selection circuit 7 and the maximum ON duty restriction voltage source Vref2 both shown in FIG. 3 are omitted.

Hereinafter, an operation of the switching-type DC power source apparatus will be explained.

The operation of the apparatus in an ordinary state is the same as that of the conventional switching-type DC power source apparatus shown in FIG. 3.

A commercial AC voltage supplied from input terminals 1 and 2 is full-wave rectified by a diode bridge DB1, and an obtained pulsating voltage is then supplied to an active filter 10. The filter 10 performs switching on the supplied pulsating voltage by using a switching FET Q1 at a frequency equal to or higher than several tens kHz during an entire period. In a period during which the FET Q1 is ON, the current flows in the FET Q1 through a choke coil L1, whereby an electromagnetic energy is stored in the coil L1. Subsequently, when the FET Q1 is OFF, the electromagnetic energy stored in the coil L1 charges a smoothing capacitor C1 through a rectifier diode D1 and is also supplied to a load such as a DC—DC converter or the like through an output terminal 3.

ON and OFF of the switching FET Q1 are controlled by the control circuit 5 to output a DC constant voltage to the output terminals 3 and 4. Also, PWM control (i.e., pulse width control) is performed by the circuit 5 such that an input current waveform becomes a sine wave.

The control circuit 5 detects the output voltage by using output voltage detection resistors R5 and R6, detects a full-wave rectified pulsating voltage waveform by using a sine wave detection resistor R1, detects a current flowing in the circuit 10 by using a current detection resistor R2, outputs the DC constant voltage to the output terminals 3 and 4, and also controls a width of a drive pulse (i.e., gate pulse) to be supplied to a gate of the FET Q1 being a switching element such that the AC input current flowing in the circuit comes to have the sine waveform.

Subsequently, the operation of the control circuit 5 will be explained in detail.

In order to stabilize the output DC voltage against load variation and input variation, an voltage error amplifier VEA outputs a DC voltage (this voltage determines magnitude of threshold being output of multiplier 6) such that a divided voltage value of the output voltage detected by the output voltage division resistors R5 and R6 becomes equal to a reference voltage Vref1. The multiplier 6 multiplies the sine waveform (this waveform determines output waveform of multiplier 6) detected by the sine wave detection resistor R1 and the output of the voltage error amplifier VEA together, and then outputs a threshold voltage for the current error amplifier IEA.

The current error amplifier IEA operates such that, in the circuit, the current corresponding to voltage drop at the current detection resistor R2 becomes equal to the threshold voltage being the output of the multiplier 6. The comparator COMP compares an output of the amplifier IEA and an output of the oscillator (OSC) 8 with each other to generate a pulse for driving the switching FET Q1.

In such the drive pulse for driving the FET Q1, ON duty is controllable within a range from 0% to 100% in principle. However, the FET Q1 practically operates at ON duty 100% or so when an instantaneous value of a commercial AC power source being an input is close to "0" volt. Thus, also in consideration of an off time of the switching FET Q1, there is some fear that practically the FET Q1 can not be completely turned off, whereby the current continues to flow in the choke coil L1 and the switching FET Q1 for a certain time.

Therefore, if the resistor Rv acting as a current supply means is added, from a viewpoint of the current error amplifier IEA, the current seems to be flowing in the current detection resistor R2. That is, the current is seemingly flowing in the resistor R2. Thus, in a case where the instantaneous value of a commercial AC input voltage gradually decreases, the output of the current error amplifier IEA acts to narrow a pulse width when the instantaneous value falls below a certain value. Then, in a case where the commercial AC input voltage once becomes "0" volt and then the instantaneous value gradually increases, the output of the amplifier IEA acts to gradually expand or widen the pulse width when the instantaneous value exceeds the certain value. For this reason, the FET Q1 operates such that it softly starts at each cycle of commercial AC frequency, thereby preventing a prickle-like current from flowing.

Figure 2:
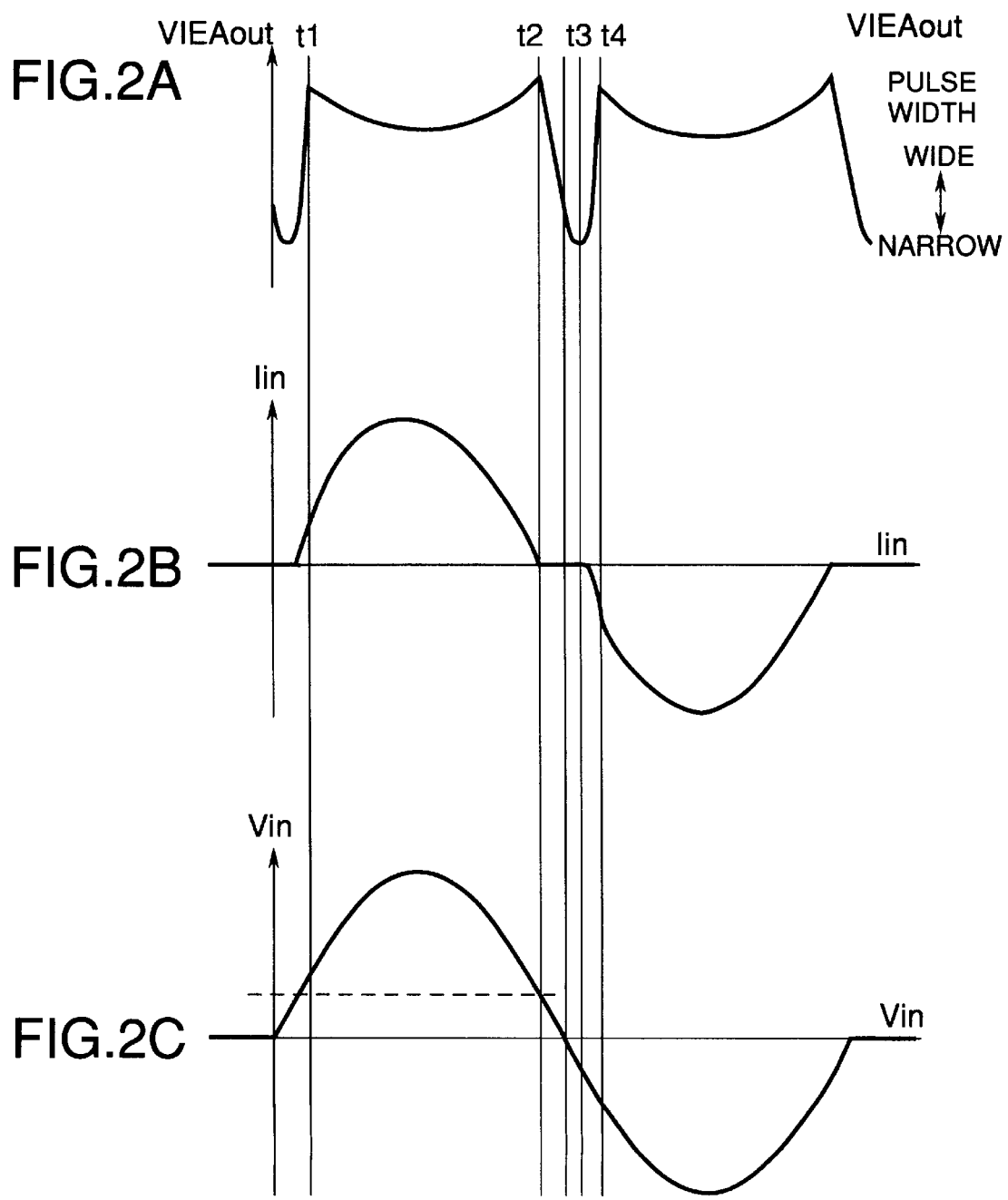
FIGS. 2A, 2B and 2C are views each showing an example of waveform at each unit in FIG. 1.

FIGS. 2A to 2C are views showing examples of waveforms at respective units in FIG. 1. Concretely, FIG. 2A shows the waveform of an output voltage VIEAout of the current error amplifier IEA, FIG. 2B shows the waveform of an AC input current Iin, and FIG. 2C shows the waveform of an AC input voltage Vin.

In FIGS. 2A to 2C, during a period from a time t1 to a time t2, the ordinary PWM control (i.e., pulse width control) is performed. Then, the instantaneous value of the AC input voltage Vin gradually decreases, relation on magnitude between the seeming current based on the voltage Vcc and the resistor R2 and the input current Iin is inverted at the time t2, and the current error amplifier IEA starts operating to narrow the ON time width of the drive pulse.

Then, when the AC input voltage Vin once becomes "0" volt and the instantaneous value gradually increases, then the current error amplifier IEA starts operating to again expand the drive pulse at a time t3 and gradually expands the ON time width of the drive pulse up to a time t4. At the time t4, the expanded width coincides with the pulse width required by the multiplier 6. During such a period (from time t3 to time t4), it causes the FET Q1 to softly start operating. In the drawings, the state at the time t4 is identical with that at the time t1.

As a result, in the state that the instantaneous value of the input current is equal to or lower than the certain value, since the current error amplifier IEA operates such that the ON time width of the drive pulse is narrowed, the circuit components as in FIG. 3 to restrict the maximum ON duty becomes unnecessary. Also, the circuit components as in FIG. 3 to select the minimum value voltage becomes unnecessary.

Further, since the added resistor Rv makes the certain amount of current as if it is always flowing in the current detection resistor R2 (i.e., current being seemingly flowing in resistor R2), it is possible to reduce overshoot of the output voltage at the time when the active filter starts.

As described above, when the instantaneous value of the commercial AC power source being the input is close to "0" volt, the input current requested as the multiplier output is made as if it is flowing in the input current detection resistor. That is, by making the current seemingly flow in the resistor, the output of the multiplier is continued to act to narrow the pulse width. Thus, it is possible to prevent the prickle-like input current including the large number of harmonic components from flowing, and also to reduce the output overshoot of the output voltage at the time when the active filter starts in a light-load state.

In the above embodiment, one terminal of the resistor Rv is connected to the power source Vcc of the control circuit 5 such that the current is supplied from the power source Vcc. However, the present invention is not limited to this. That is, even if the terminal of the resistor Rv is connected to the source of reference voltage Vref1 such that the current is supplied from the reference voltage Vref1, the same effect as above can be derived by appropriately selecting a value of the resistor Rv.

The present invention is not limited to the above-described embodiment, but is applicable to various modifications within the scope and spirit of the appended claims.

What is claimed is:

1. A switching-type DC (direct current) power source apparatus comprising:

a rectifier circuit using an AC (alternate current) power source as an input, for rectifying a voltage of the AC power source;

a booster-type chopper circuit for inputting an output voltage of said rectifier circuit and outputting a DC voltage;

a current detection circuit for detecting an output current of said rectifier circuit;

a control circuit for controlling said booster-type chopper circuit such that a current waveform detected by said current detection circuit becomes analogous to the input voltage of the AC power source; and a current supply circuit for supplying a current to said current detection circuit even at timing when an output of the AC power source has zero level.

2. An apparatus according to claim 1, wherein said current supply circuit is a resistor element of which one end is connected to a predetermined power source and the other end is connected to said current detection circuit.

3. An apparatus according to claim 1, wherein said booster-type chopper circuit has a switching element, and said control circuit controls ON/OFF of said switching element.

4. An apparatus according to claim 3, wherein said control circuit further comprises:

a voltage error amplifier for outputting a voltage according to a difference between an output voltage of said booster-type chopper circuit and a first reference voltage;

a multiplier circuit for multiplying an output of said voltage error amplifier and an output waveform of said rectifier circuit together;

a current error amplifier for outputting a voltage according to a difference between an output of said multiplier circuit and the output of said current detection circuit; and a comparison circuit for comparing an output of said current error amplifier and a predetermined signal with each other and outputting a signal to control said switching element.

5. An apparatus according to claim 1, wherein said rectifier circuit performs full-wave rectification on the input AC voltage.

6. A switching-type DC (direct current) power source apparatus comprising:

a rectifier circuit using an AC (alternate current) power source as an input, for rectifying a voltage of the AC power source;

an active filter circuit connected to said rectifier circuit and containing a choke coil, a switching element, a diode and a capacitor;

a current detection circuit for detecting a current flowing in said active filter circuit;

a voltage detection circuit for detecting an output voltage of said active filter circuit;

a waveform detection circuit for detecting an output waveform of said rectifier circuit;

a control circuit for controlling driving of the switching element on the basis of an output of said current detection circuit, an output of said voltage detection circuit and an output of said waveform detection circuit; and a current supply circuit for making a current as if it is flowing in said current detection circuit even at timing when an output of the AC power source has zero level.

7. An apparatus according to claim 6, wherein said current supply circuit is a resistor element of which one end is connected to a predetermined power source and the other end is connected to said current detection circuit.

* * * * *

UNITED STATES PATENT AND TRADEMARK OFFICE
CERTIFICATE OF CORRECTION

PATENT NO. : 6,011,707

DATED : January 4, 2000

INVENTOR(S): RYUTA MINE

Page 1 of 2

It is certified that error appears in the above-identified patent and that said Letters Patent is hereby corrected as shown below:

COLUMN 1:
Line 20, "occurred" should read --occurring--, and "the" should read --a--;
Line 21, "problem." should read --a problem--; and
Line 44, "been" should be deleted.

COLUMN 3:
Line 31, "the" (2nd occurrence) should read --a--.

COLUMN 4:
Line 4, "responses" should read --responds--;
Line 10, "the" (1st occurrence) should be deleted;
Line 11, "prickle-like" should read --trickle-like--;
Line 29, "prickle-like" should read --trickle-like--;
Line 40, "prickle-like" should read --trickle-like--; and
Line 45, "prickle-like" should read --trickle-like--.

UNITED STATES PATENT AND TRADEMARK OFFICE
CERTIFICATE OF CORRECTION

PATENT NO. : 6,011,707

DATED : January 4, 2000

INVENTOR(S): RYUTA MINE

It is certified that error appears in the above-identified patent and that said Letters Patent is hereby corrected as shown below:

COLUMN 6:
Line 29, "prickle-like" should read --trickle-like--; and
Line 61, "becomes" should read --become--.

Signed and Sealed this

Thirteenth Day of February, 2001

Attest:

NICHOLAS P. GODICI

Attesting Officer       Acting Director of the United States Patent and Trademark Office